3,778,418
MALEINIZATION PROCESS

Yasuharu Nakayama, 1200 Yahata, Hiratsuka, Japan
No Drawing. Filed Sept. 22, 1971, Ser. No. 182,912
Claims priority, application Japan, Sept. 24, 1970, 45/84,344; Sept. 28, 1970, 45/85,244
Int. Cl. C08c 5/00; C08f 27/00
U.S. Cl. 260—78.4 D                 20 Claims

ABSTRACT OF THE DISCLOSURE

In maleinization process in which a maleic anhydride compound is reacted with at least one of unsaturated polymers having ethylenoic double bond in the molecule, unsaturated fatty acids having 8 to 18 carbon atoms and esters of said unsaturated fatty acids to produce a maleinized product, the improvement wherein said reaction is carried out in the presence of at least one of nitrogen-containing compounds selected from the group consisting of ammonia, ammonium salts of saturated fatty acids, monoamine compounds, diamine compounds and amide compounds.

---

This invention relates to maleinization process, more particularly to an improvement in manufacturing an addition product of maleic anhydride or derivative thereof and a polymer having ethylenic double bond in the molecule or unsaturated fatty acid having 8 to 18 carbon atoms.

The maleinization of a polymer having ethylenic double bond in the molecule or unsaturated fatty acid having 8 to 18 carbon atoms proceeds radically or thermally, as well known in the art. According to the conventional method, however, undesired currying reaction occurs unavoidably, resulting in the gelation of the system and rendering the process troublesome.

Many attempts have been made to eliminate the above drawbacks but no successful method has been proposed yet. For example, it has been proposed to conduct the maleinization reaction thermally in the presence of a radical reaction inhibitor or a specific metal salt. With the use of radical reaction inhibitor, the maleinization reaction proceeds free of gelation to produce maleinized product, but it is impossible to obtain a maleinized product having maleic anhydride or derivatives thereof added thereto in a sufficient amount since the amount of maleic anhydride or derivatives thereof added to the starting unsaturated polymer or unsaturated fatty acid is restricted to a low order of ranges. When metal salts are used, unfavorable metals are rested in maleinized product. Furthermore, there are other drawbacks that the starting unsaturated polymer to be maleinized is limited to the polymer having a low molecular weight; that the product obtained is colored to some extent, this reducing the commercial value thereof; and that the reaction proceeds effectively only at highly elevated temperatures.

One object of the invention is accordingly to provide an improved maleinization process in which the maleinization reaction can proceed free of gelation to produce maleinized products having maleic anhydride or derivatives thereof added thereto in widely varying ranges of amount as desired.

Another object of the invention is to provide a process for manufacturing a maleinized product of unsaturated polymer and unsaturated fatty acid without undesired coloration.

Another object of the invention is to provide a process for manufacturing a maleinized product of unsaturated polymer in which the polymer having a wide range of molecular weight, from low molecular weight to high molecular weight, can be used as a starting material without any trouble in procedures.

In reacting an unsaturated polymer having ethylenic double bond in the molecule or an unsaturated fatty acid having 8 to 18 carbon atoms with a maleic anhydride compound to produce a maleinized product, the present process is characterized in that said reaction is carried out in the presence of at least one of specific nitrogen-containing compounds selected from the group consisting of ammonia, an ammonium salt of a saturated fatty acid, a monoamine compound, a diamine compound and an amide compound.

According to the researches of the present inventor it has been found that when maleinization reaction of unsaturated polymer having ethylenic double bond in the molecule or unsaturated fatty acid having 8 to 18 carbon atoms is conducted in the presence of said specific nitrogen-containing compound the maleinized product having maleic anhydride or derivatives thereof added thereto in a wide range of amount as desired can be obtained without any disadvantages as encountered in the known methods. In accordance with the present invention a maleinization reaction selectively proceeds with the gelation of the reaction system completely prevented, making it possible to obtain a maleinized product having desired properties with ease, free of coloration of the product. Further, unsaturated polymer having a wide range of molecular weight can be used without any trouble.

The unsaturated polymer used in the invention has at least one ethylenic double bond in the main chain and/or side chain of the polymer. Such polymers include natural rubber such as raw rubber, guttapercha, balata, etc., and synthetic diene polymers and copolymer including 1,2-polymerization products and 1,4-polymerization products. The molecular weight of the synthetic diene polymers used in the invention may vary over a wide range, and those having a such high molecular weight of as 500,000 may be applicable in the invention. Thus the molecular weight ranging from 300 to 500,000, usually from 1,000 to 200,000 may be used in the invention. Examples of the dienes are butadiene, isoprene, chloroplene, etc. The diene polymer may contain hydroxyl group, carboxyl group or the like functional group as the end group in the molecule. The copolymer of diene with at least one of ethylenically unsaturated monomer may also be used. Such monomers are, for example, styrene, alkyl ($C_1$ to $C_8$) esters of acrylic acid, alkyl ($C_1$ to $C_8$) esters of methacrylic acid, 2-methylstyrene, vinyltoluene, acrylonitrile, methacrylonitrile, and olefines having 2 to 8 carbon atoms. The copolymer used may contain more than 10 percent by weight, preferably more than 40 percent by weight of diene. These unsaturated polymers may be used alone or in admixture with one another.

The unsaturated fatty acids used in the invention are those having 8 to 18 carbon atoms. Examples thereof are oleic acid, linoleic acid, linolenic acid, eleostearic acid, licanic acid, etc. These unsaturated fatty acids can be used alone or in admixture with one another. In the invention the esters of the above unsaturated fatty acids may also be used in place of or in admixture with the above unsaturated fatty acids. Such esters are, for example, linseed oil, tung oil, perilla oil, sesame oil, rape seed oil, cotton seed oil, soy bean oil, etc. Linoleic acid, linolenic acid and their esters are most profitable to apply this invention. The above unsaturated fatty acids and esters thereof may be used in admixture with the unsaturated polymers, when required.

The maleic anhydride compounds used in the invention include those having the formula of

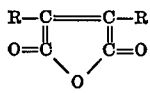

(2)

wherein R is hydrogen, a halogen or methyl group. Examples thereof are maleic anhydride, monochloromaleic anhydride, dichloromaleic anhydride, citraconic anhydride, dimethylmaleic anhydride, etc. Of these maleic anhydride is the most preferable.

According to the present invention, it is essential to carry out the maleinization reaction in the presence of a specific nitrogen-containing compound. Such nitrogen-containing compounds include ammonia, ammonium salts of saturated fatty acids, monoamine compounds, diamine compounds and amide compounds. Of these compounds ammonia may be used in the form of gaseous state or ammonia water. The ammonium salts of saturated fatty acids are those having the formula of $$R^1-COONH_4 \quad (2)$$

wherein $R^1$ is hydrogen or an alkyl group having 1 to 18 carbon atoms. Examples of ammonium salts of saturated fatty acids are, for example, ammonium formate, ammonium acetate, ammonium caproate, ammonium caprate, ammonium laurate, ammonium palmitate, ammonium stearate, etc.

The monoamine compounds used in the invention are those having the formula of

(3)

and

(4)

wherein $R^2$, $R^3$ and $R^4$ are hydrogen, allyl, propargyl, an alkyl of 1 to 18 carbon atoms or an alkyl of 1 to 18 carbon atoms containing 1 to 3 substitutes of halogen, hydroxyl, carboxyl and —$OR^8$, $R^8$ being an alkyl of 1 to 3 carbon atoms, provided that the three of $R^2$, $R^3$ and $R^4$ are not hydrogen; and $R^5$ and $R^6$ are hydrogen or an alkyl of 1 to 2 carbon atoms, and $R^7$ is hydrogen or methyl.

The diamine compounds used in the invention are those having the formula of

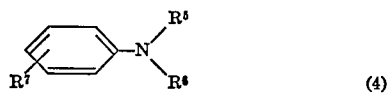

(5)

wherein $R^9$, $R^{10}$, $R^{11}$ and $R^{12}$ are hydrogen or an alkyl of 1 to 4 carbon atoms and $R^{13}$ is an alkylene of 1 to 6 carbon atoms.

The monoamine compounds represented by the Formula 3 include, for example, methyl amine, ethyl amine, propyl amine, isopropyl amine, butyl amine, pentyl amine, hexyl amine, octyl amine, octadecyl amine, ethanol amine, 2-aminopropane-1-ol, 2-chloroethyl amine, 2-aminoethyl ether, 3-methoxypropyl amine, 3-ethoxypropyl amine, α-aminovaleric acid, α-aminopropionic acid, dimethyl amine, diethyl amine, dipropyl amine, didodecyl amine, ethylpropyl amine, ethylhexadecyl amine, propylbutyl amine, butylhexadecyl amine, diethanol amine, trimethyl amine, triethyl amine, triundecyl amine, dimethylethyl amine, methylethylpropyl amine, diethylhexadecyl amine, triethanol amine, allyl amine, diallyl amine, allylmethyl amine, N,N-dimethylpropargyl amine, piperidine, etc. The monoamine compounds of the Formula 4 are, for example, aniline, aminotoluene, N-ethylaniline, N-methylaniline, N,N-dimethylaniline, etc.

The diamine compounds of the Formula 5 include, for example, methylene diamine, ethylene diamine, tetramethyl diamino methane, N,N'-dimethylmethylene diamine, N-methylethylene diamine, N,N'-dimethylethylene diamine, N-ethylethylene diamine, N,N'-dibutylethylene diamine, tetramethylene diamine, pentamethylene diamine, hexamethylene diamine, dimethylene diamine, etc.

The amide compounds used in the invention include compounds containing one or two of amide groups in the molecule. The representatives of the compounds are those having the following formula of

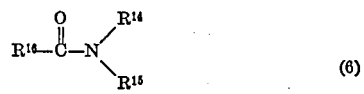

(6)

and

(7)

wherein $R^{14}$ and $R^{15}$ are phenyl, cyclohexyl or an alkyl of 1 to 4 carbon atoms, and $R^{16}$ is an alkyl of 1 to 17 carbon atoms, an alkenyl of 2 to 3 carbon atoms, phenyl, carboxyphenyl, a carboxy-substituted alkyl of 1 to 3 carbon atoms or an amide-substituted alkyl of 1 to 3 carbon atoms; and $R^{17}$ is an alkylene of 2 to 4 carbon atoms, and $R^{18}$ and $R^{19}$ are hydrogen or methyl.

The amide compounds of the Formula 6 are, for example, formamide, N-methylformamide, N,N-dimethyl formamide, N,N-diethyl formamide, acetamide, N-methyl acetamide, N,N-dimethyl acetamide, N,N-diethylacetamide, oxalic acid amide, N-phenyl acetamide, acetamide benzoic acid, propyonic acid amide, N-ethyl propyonic acid amide, butylamide, 4-methyl-2-pentene amide, pentadecane amide, octadecane amide, acryl amide, N-methylacrylamide, N,N-dimethylacryl amide, N-butylacryl amide, N,N-dibutylacryl amide, methacryl amide, N-methylmethacryl amide, N,N-dimethylmethacryl amide, N,N-dimethyl succinic acid amide, succinic acid amide, maleic acid amide, N,N-dimethyl maleic acid amide, N,N-diethyl maleic acid amide, cyclohexyl amide, pyrrolidone, benzamide, N-ethyl benzamide, N-cyclohexyl benzamide, malonamide, adipoamide, etc.

Amide compounds of the Formula 7 are, for example, caprolactam, γ-valerolactam, N-methyl-δ-valerolactam, pyrrolidone, etc.

Of the above nitrogen-containing compounds, particularly preferable are (1) ammonium; (2) such ammonium salts of saturated fatty acids as ammonium acetate and ammonium laurate; (3) such monoamines as methyl amine, ethyl amine, propyl amine, butyl amine, dimethyl amine, triethyl amine, diethyl amine, dipropyl amine, ethanol amine, di(2-ethyl hexyl) amine, diethanol amine, piperidine, aniline, N-ethylaniline and N-methyl aniline; (4) such diamines as methylene diamine, ethylene diamine, N-methylethylene diamine and N,N-dibutylethylene diamine; (5) such amide compounds as N-methyl formamide, N,N-dimethyl formamide, N,N-dimethyl acetamide, N,N-diethyl formamide, N,N-diethyl acetamide, maleic acid amide, acryl amide, caprolactam, γ-valerolactam and pyrrolidone.

The ammonia, ammonium salts of saturated fatty acids, monoamine compounds, diamine compounds and amide compounds as described above may be used singly or in admixture with one another. The amount of these compounds used may vary over a wide range. For example, they display effect whenever used in such a small amount as 0.01 weight percent, based on the weight of the maleic anhydride compound used. The preferable amount of the nitrogen-containing compounds to be used may vary in accordance with the kinds thereof. For instance, the amide compounds may be used in an amount of less than 50 percent by weight, based on the weight of the maleic anhydride used, though no adverse effect is accompanied when used in larger amount, and the ammonia, ammonium salts of fatty acids, monomine compounds and diamine compounds may be used in an amount of less than 30 percent by weight, based on the maleic anhydride compound used. Particularly preferable amount of the former is in the range of 0.5 to 40 percent by weight and that of the latter is in the range of 0.1 to 20 percent by weight, based on the weight of the maleic anhydride compound.

In accordance with this invention, maleic anhydride is reacted with unsaturated polymers, unsaturated fatty acids and/or esters thereof in conventional manner as heretofore practiced for maleinization in the presence of the above specific nitrogen-containing compounds. Where the reaction is carried out by radical reaction, for instance, ionizing radiation, ultraviolet active ray or photosensitizer may be applied to the reaction system, or a radical initiator such as an organic or inorganic peroxide, sulfide, sulfinic acid, azo compound or organic metal compound is added to the reaction system alone or in combination with oxygen or an oxygen supplying compound. As the source of ionizing radiation, Co 60, electro-accelerator, etc. are used at the power of $10^3$ to $10^8$ rad. The radical initiator is added to the reaction system in an amount of 0.01 to 30%, based on the starting polymer or fatty acid. The reaction temperature may generally vary in a wide range of about $-50$ to $250°$ C. However, at high temperatures, the reaction product tends to be colored, whereas at very low temperatures a suitable radical initiator has to be selected and the reaction proceeds at a lower rate. Therefore it is especially preferable to conduct the reaction at about 0 to $160°$ C. If the maleinization reaction is to be effected solely by heating satisfactory results will be obtained by heating the reaction system at 100 to $250°$ C. Further whichever method may be employed, organic solvents may be added to the reaction system, as required, to control the viscosity of the reaction system and to permit the reaction to proceed efficiently. Exemplary of the solvent are aliphatic hydrocarbon solvents such as petroleum ether, petroleum benzine, normal hexane, etc.; aromatic hydrocarbon solvents such as benzene, toluene, xylene, etc.; terpene hydrocarbon solvents such as monoterpene, diterpene, triterpene, etc.; halogenated hydrocarbon solvents, such as dichloromethane, chloroform, dichloroethane, etc.; ketone solvents such as acetone methylethyl ketone, methylisobutyl ketone, etc.; ether solvents such as methyl ether, ethyl ether, propyl ether etc.; ester solvents such as methyl acetate, ethyl acetate, butyl acetate, etc.; acetal solvents such as acetal dehyde dimethyl acetal, acetal dehyde diethyl acetal, etc.; furan solvents such as tetrahydrofuran, 1-methyltetrahydrofuran, etc.; sulfur derivative solvent such as dimethylsulfoxide, carbondisulfide, etc. These solvents may be used singly or in mixture. The amount of the solvents may vary over a wide range in accordance with the starting materials to be used, reaction conditions to be applied and other factors and is not critical.

For a better understanding of the invention examples are given below:

EXAMPLE 1

In a glass reaction container were placed 5 g. of maleic anhydride (hereinafter referred to as "MAH"), 5 g. of polybutadiene (having a molecular weight of 4930 and consisting of 92.3% of 1,2-bond and 7.7% of trans-1,4-bond; hereinafter referred to as "polymer A"), 50 mg. of azobisisobutyronitrile, a predetermined amount of solvents shown in Table 1 below and a predetermined amount of various nitrogen-containing compounds shown in Table 1. The mixture was heated at $60°$ C. in a nitrogen gas atmosphere for a period shown in Table 1 for maleinization.

The increase in viscosity of the reaction mixture and the oxygen content of the product were measured with the results given in Table 1. For comparison, Table 1 further shows the results obtained without using any nitrogen-containing compound.

The increase in viscosity given in Table 1 was determined by the following equation:

Increase in viscosity: $B/A$ wherein A is the viscosity of the mixture solution before reaction and B is the viscosity of the reaction solution obtained upon the lapse of a given period of reaction time. The respective viscosities were measured at $30°$ C. by an Ostwald's viscometer.

To determine the oxygen content, the reaction solution obtained by reaction of a given period of time was added to methanol for precipitation of the product and the resulting precipitate was washed with water and dried for recovery. The product obtained was then subjected to elementary analysis. The result is expressed in percentage.

TABLE 1

| | Solvent | | N-containing compound used | | Reaction period | | | | | | |
|---|---|---|---|---|---|---|---|---|---|---|---|
| | | | | | 2 hrs. | 4 hrs. | 6 hrs. | 10 hrs. | 24 hrs. | 10 hrs. | 24 hrs. |
| Number | Name | Amount used | Name | Amount used | Increase in viscosity | | | | | Oxygen content (wt. percent) | |
| 1 | X[1] | 54 cc. | DEA[6] | 1 cc. | 1.05 | 1.08 | 1.12 | 1.22 | 1.57 | 2.8 | 5.1 |
| 2 | X | 54 cc. | n-BA[7] | 1 cc. | 1.05 | 1.09 | 1.13 | 1.18 | 1.59 | 2.2 | 3.6 |
| 3 | X | 54 cc. | DEolA[8] | 1 cc. | 1.16 | 1.30 | 1.39 | 1.69 | 3.55 | 4.0 | 5.9 |
| 4 | X | 54 cc. | PPD[9] | 1 cc. | | | | 1.22 | 1.76 | 2.5 | 3.7 |
| 5 | X | 55 cc. | None | | 1.10 | 1.21 | 1.35 | 1.89 | Gelled | 3.3 | |
| 6 | THF[2] | 54.5 cc. | AIA[10] | 0.5 cc. | | 1.14 | 1.20 | 1.29 | 1.61 | 2.0 | 2.8 |
| 7 | THF | 54 cc. | AA[11] | 1 g. | 1.17 | 1.36 | 1.57 | 1.85 | 2.95 | 4.3 | 5.2 |
| 8 | THF | 54.5 cc. | 28%-AW[12] | 0.5 cc. | 1.11 | 1.19 | 1.25 | 1.51 | 2.29 | 3.5 | 4.6 |
| 9 | THF | 55 cc. | None | | | 1.38 | 1.57 | 2.09 | Gelled | 3.9 | |
| 10 | CF[3] | 54 cc. | DEA[13] | 1 g. | | | | 1.51 | 2.16 | 2.9 | 4.4 |
| 11 | X | 54 cc. | DMF[14] | 1 cc. | 1.06 | 1.11 | 1.16 | 1.25 | 1.71 | 2.2 | 4.2 |
| 12 | X | 52 cc. | DMF | 3 cc. | 1.04 | 1.06 | 1.09 | 1.16 | 1.36 | 2.0 | 3.5 |
| 13 | X | 50 cc. | DMF | 5 cc. | 1.04 | 1.07 | 1.10 | 1.17 | 1.41 | 2.7 | 3.4 |
| 14 | X | 45 cc. | DMF | 10 cc. | | 1.08 | 1.13 | 1.20 | 1.51 | 2.6 | 3.9 |
| 15 | X | 52 cc. | DMA[15] | 3 cc. | 1.06 | 1.07 | 1.10 | 1.16 | 1.38 | 2.2 | 3.5 |
| 16 | X | 52 cc. | N-MF[16] | 3 cc. | 1.19 | 1.28 | 1.37 | 1.51 | 1.70 | 3.0 | 4.3 |
| 17 | X | 52 cc. | FA[17] | 3 cc. | 1.21 | 1.27 | 1.33 | 1.47 | 2.04 | 3.1 | 4.8 |
| 18 | X | 50 cc. | CLM[18] | 5 g. | 1.04 | 1.09 | 1.13 | 1.26 | 1.62 | 2.7 | 5.4 |
| 19 | X | 50 cc. | PRD[19] | 5 g. | | 1.25 | | 1.31 | 1.46 | 1.8 | 2.0 |
| 20 | X | 55 cc. | None | | 1.10 | 1.21 | 1.35 | 1.89 | Gelled | 3.3 | |
| 21 | THF | 52 cc. | DMF | 3 cc. | | 1.35 | 1.61 | 1.84 | 2.83 | 3.8 | 5.1 |
| 22 | THF | 54 cc. | BA[20] | 0.5 g. | | | | 1.62 | 3.07 | 3.3 | 4.8 |

See footnotes at end of table.

TABLE I—Continued

| | Solvent | | N-containing compound used | | Reaction period | | | | | | |
|---|---|---|---|---|---|---|---|---|---|---|---|
| | | | | | 2 hrs. | 4 hrs. | 6 hrs. | 10 hrs. | 24 hrs. | 10 hrs. | 24 hrs. |
| Number | Name | Amount used | Name | Amount used | Increase in viscosity | | | | | Oxygen content (wt. percent) | |
| 23 | THF[2] | 55 cc. | None | | 1.38 | 1.57 | 2.09 | Gelled | | 3.9 | |
| 24 | MEK[4] | 55 cc. | MAM[21] | 0.5 g. | 1.15 | | 1.39 | 5.98 | | 2.7 | 5.4 |
| 25 | MEK | 55 cc. | None | | 1.19 | 1.28 | 1.50 | 13.3 | | 3.2 | 5.2 |
| 26 | DCE[5] | 52 cc. | DMF | 3 cc. | 1.18 | 1.28 | 1.56 | | | 3.2 | |
| 27 | DCE | 55 cc. | None | | 1.32 | 1.54 | Gelled | | | 5.6 | |

[1] X stands for xylene.
[2] THF stands for tetrahydrofuran.
[3] CF stands for chloroform.
[4] MEK stands for methylethyl ketone.
[5] DCE stands for dichloroethane.
[6] DEA stands for diethyl amine.
[7] n-BA stands for n-butyl amine.
[8] DEolA stands for diethanol amine.
[9] PPD stands for piperidine.
[10] AlA stands for allyl amine.
[11] AA stands ammonium acetate.
[12] 28%-AW stands for 28-weight percent ammonia water.
[13] DEA stands for diethylamine.
[14] DMF stands for dimethylformamide.
[15] DMA stands for dimethylacetamide.
[16] N-MF stands for N-methylformamide.
[17] FA stands for formamide.
[18] CLM stands for caprolactam.
[19] PRD stands for pyrrolidone.
[20] BA stands for benzamide.
[21] MAM stands for maleic acid monoamide.

As will be apparent from Table 1, the use of the nitrogen-containing compounds results in a low increase in vsicosity, while the viscosity increases markedly upon the lapse of a reaction period when no nitrogen-containing compounds are used. The increase in viscosity of the reaction system shows the production of undesired cross-linked products. Thus it is evident that the use of the nitrogen-containing compounds used are effective in preventing gelation.

EXAMPLE 2

5 g. of polymer A, 5 g. of MAH, 1 cc. of triethyl amine, 54 cc. of xylene, and 50 mg. of azobisisobutyronitrile were mixed together at room temperature, whereupon the mixture turned black. The mixture was then reacted at 60° C. for 24 hours in a nitrogen gas atmosphere. No gelation was observed during the reaction. The resultant reaction mixture was poured into methanol for precipitation and the precipitate was washed with water repeatedly to obtain maleinized product. The oxygen content by elementary analysis of the product was 3.6%.

EXAMPLE 3

5 g. of polymer A, 5 g. of MAH, 1 cc. of aniline, 54 cc. of xylene, and 50 mg. of azobiisobytronitrile were mixed together, whereupon mixture turned into a white turbid mixture, which was then reacted at 60° C. for 24 hours in a nitrogen gas atmosphere. During the reaction no gelation was observed. The resultant maleinized product was recovered in the same manner as in Example 2. The oxygen content of the product was 3.2%.

EXAMPLE 4

10 g. of polybutadiene (having a molecular weight of 1190 and consisting of 90.3% of 1,2-bond and 9.7% of trans-1,4-bond; hereinafter referred to as polymer B''), 2 g. of MAH, 200 mg. of azobisisobutyronitrile and 0.3 cc. of diethyl amine were mixed together and reacted at 60° C. for 24 hours in a nitrogen atmosphere. As a result, the viscosity of the reaction mixture increased, but no gelation took place. The resultant maleinized product was recovered in the same manner as in Example 2. The oxygen content of the product was 2.1%.

EXAMPLE 5

20 g. of polymer B, 200 mg. of benzoyl peroxide, 4 g. of MAH, 0.5 cc. of diethyl amine, and 20 cc. of benzene were mixed together and then reacted with stirring at 83° C. for 8 hours, whereby the reaction solution turned slightly brown without hardly any increase in viscosity. The resultant maleinized product was recovered in the same manner as in Example 2. The oxygen content of the product was 2.5%.

COMPARISON EXAMPLE 1

20 g. of polymer B, 200 mg. of benzoyl peroxide, 4 g. of MAH and 20 cc. of benzene were mixed together and then reacted under the same conditions as in Example 5. In 11 minutes, the reaction system gelled.

EXAMPLE 6

20 g. of polymer B, 4 g. of MAH and 0.1 cc. of diethyl amine were mixed together and then reacted at 200° C. for 2 hours, whereby the reaction solution turned black without gelation. The reaction solution was dissolved in tetrahydrofuran and then added to water to cause the resultant maleinized product to precipitate for recovery. The product was finally washed with methanol. The oxygen content of the product was 7.9%.

EXAMPLE 7

20 g. of polymer B, 6 g. of MAH and 1 cc. of di(2-ethyl hexyl)amine were mixed together and reacted at 200° C. for 2 hours, whereby the reaction solution turned black without gelation. The resultant maleinized product was recovered in the same manner as in Example 2. The oxygen content of the product was 8.8%.

EXAMPLE 8

5 g. of polybutadiene (having a molecular weight of 35,000 and intrinsic viscosity of 0.23 at 30° C. in toluene and consisting of 100% of cis-1,4-polymer), 15 g. of MAH, 50 cc. tetrahydrofuran, 2 cc. of diethyl amine and 100 mg. of azobisisobutylronitrile were mixed together and reacted at 60° C. for 27 hours in a nitrogen gas atmosphere. The increase in viscosity of the reaction mixture was 2.38. The resultant maleinized product was recovered in the same manner as in Example 2. The oxygen content of the product was 4.9%.

EXAMPLE 9

20 g. of polybutadiene (having a molecular weight of 1900 and consisting of 1% of 1,2-bond, 27% of trans-1,4-bond and 72% of cis-1,4-bond), 6.2 g. of MAH and 0.1 cc. of diethyl amine were mixed together and reacted at 200° C. for 2 hours, whereby the reaction solution turned black without gelation. The reaction product was recovered in the same manner as in Example 6. The oxygen content of the product was 7.8%.

EXAMPLE 10

Acrylonitrile-butadiene copolymer containing 38.6 mole percent of acrylonitrile and having an intrinsic viscosity of 0.13 at 30° C. in methyl ethyl ketone was dissolved in terahydrofuran and then in acetone. The resulting solution was poured into methanol to cause the acrylonitrile-butadiene copolymer to precipitate. This procedure was repeated again, whereupon the precipitate was taken out and dried. 25 g. of the dried polymer thus prepared, 5 g. of MAH, 50 mg. of azobisisobutylronitrile, 55 cc. of tetrahydrofuran and 1 cc. of diethyl amine were mixed together and then reacted at 60° C. for 24 hours in a nitrogen gas at mosphere. The increase in viscosity of the reaction mixture was 1.05. The resultant maleinized product was recovered in the same manner as in Example 2. The oxygen content of the product was 3.8%.

EXAMPLE 11

To the starting mixture as used in Example 10 was further added 50 mg. of azobisisobutyronitrile and the resulting mixture was reacted at 60° C. for 24 hours. The increase in viscosity of the reaction mixture was 1.09. The resultant maleinized product was recovered in the same manner as in Example 2. The oxygen content of the product was 5.8%.

EXAMPLE 12

1 g. of raw rubber, 50 cc. of benzene, 50 mg. of azobisisobutyronitrile, 1 cc. of diethyl amine and 5 g. of MAH were mixed together and then reacted at 60° C. for 24 hours in a nitrogen gas atmosphere, which resulted in only slight increase in viscosity of the reaction mixture. The resultant maleinized product was recovered in the same manner as in Example 2. The oxygen content of the product was 11.4%.

EXAMPLE 13

20 g. of industrial linseed oil, 5.4 g. of MAH and 0.05 cc. of diethyl amine were mixed together and then reacted at 200° C. for 3 hours. The resultant reaction mixture was recovered in the same manner as in Example 2. The oxygen content of the product was 18%.

COMPARISON EXAMPLE 2

20 g. of industrial linseed oil and 5.4 g. of MAH were mixed together and reacted at 200° C. for 3 hours. The oxygen content of the reaction product was 19%, and the viscosity of the reaction solution was 3 times higher than that of the reaction solution obtained in Example 13.

EXAMPLE 14

5 g. of polymer A, 5 g. of citraconic anhydride, 100 mg. of azobisisobutyronitrile, 52 cc. of xylene and 3 cc. of dimethylformamide were placed in a glass reaction container and reacted at 60° C. in a nitrogen gas atmosphere. The increase in viscosity of the reaction mixture and the oxygen content of the resultant maleinized product were measured as the reaction proceeded in the same manner as in Example 1. The results thereof are shown in the following Table 2. No coloration was observed in the reaction product obtained.

COMPARISON EXAMPLE 3

5 g. of polymer A, 5 g. of citraconic anhydride, 100 mg. of azobisisobutyronitrile and 55 cc. of xylene were reacted in the same manner as in Example 14. The increase in viscosity and oxygen content were measured with the results shown in the following Table 2.

TABLE 2

|  | Reaction time | | | | | | | | |
| --- | --- | --- | --- | --- | --- | --- | --- | --- | --- |
|  | 6 hrs. | 10 hrs. | 24 hrs. | 35 hrs. | 48 hrs. | 58 hrs. | 24 hrs. | 35 hrs. | 58 hrs. |
|  | Increase in viscosity | | | | | | Oxygen content (percent) | | |
| Example 14 | 1.04 | 1.06 | 1.11 | 1.17 | 1.22 |  | 1.1 |  |  |
| Comparison Example 3 | 1.11 | 1.17 | 1.42 | 1.87 |  | 3.32 | 2.0 | 2.2 | 3.32 |

EXAMPLE 15

5 g. of polybutadiene, 5 g. of MAH, 10 cc. of dimethylformamide and 20 cc. of tetrahydrofuran were placed in a quartz polymerization tube and ultra-violet ray was applied thereto in a nitrogen gas atmosphere at 25° C. for 5.5 hours by using a 75-watt high pressure mercury lamp at a distance of 10 cm. from the polymerization tube. The color of this reaction solution changed from brown to black with hardly any increase in viscosity. The resultant maleinized product was recovered in the same manner as in Example 2. The oxygen content of the product was 12.4%.

EXAMPLE 16

10 g. of polymer B, 10 g. of MAH, 5 cc. of dimethylformamide, 40 cc. of toluene and 200 mg. of benzoyl peroxide were placed in a glass reaction container and reacted with stirring at 111° C. for 2.5 hours. This reaction solution was colored in brown with hardly any increase in viscosity. The resulting solution was mixed with water and left to stand for one day. After removing toluene from the solution, the solution was dissolved in tetrahydrofuran and the resulting solution was added to methanol for precipitation to take out the reaction product, which was then subjected to elementary analysis to give an oxygen content of 6.9%. The reaction product was light brown in color.

EXAMPLE 17

10 g. of polymer B, 2 g. of MAH, 15 cc. of benzene, 2 cc. of dimethyl acetamide and 100 mg. of azobisisobutyronitrile were placed in a glass reaction container and reacted with stirring at 60° C. for 24 hours in a nitrogen gas atmosphere. The increase in viscosity of the reaction mixture was 1.67. The maleinized product, light brown in color, was recovered in the same manner as in Example 2. The oxygen content of the product was 2.0%.

EXAMPLE 18

20 g. of polymer B, 10 g. of MAH, 20 cc. of xylene and 0.5 cc. of dimethylformamide were reacted at 143° C. for 16 hours. The reaction product was precipitated in methanol and taken out. The product was then dissolved in tetrahydrofurane and then precipitated in water and in methanol, once respectively, to purify the reaction product. Elementary analysis of the product gave an oxygen content of 8.5%. The reaction product was slightly colored in black but no gelation was observed.

COMPARISON EXAMPLE 4

Reaction was carried out under the same conditions as in Example 18 except that dimethylformamide was not used. In 15 minutes, the reaction system gelled.

EXAMPLE 19

20 g. of polymer B, 10 g. of MAH, 20 cc. of xylene, 2 g. of acrylamide were reacted at 140–150° C. for 12 hours. As a result, the reaction solution turned brown, but no gelation was observed. The resultant maleinized product was recovered in the same manner as in Example 2. The oxygen content in this reaction product was 7.1%.

EXAMPLE 20

1 g. of highly polymerized stylene-butadiene copolymer (containing 25 mole percent of styrene and having a molecular weight of about 200,000 and consisting of 14% of 1,2-bond, 37% of cis-1,4-bond and 49% of trans-1,4-bond) was dissolved in tetrahydrofuran and then precipitated in methanol. The precipitate was dissolved in 100 cc. of xylene. 5 g. of MAH, 6 cc. of dimethylformamide, and 50 mg. of azobisisobutyronitrile were then added to the resulting solution. The mixture was heated for reaction at 60° C. in a nitrogen gas atmosphere for 24 hours and 48 hours respectively. As a result, the increase in viscosity of the resultant mixture was only 1.07 in 24 hours and 1.11 in 48 hours. The resultant maleinized products were recovered respectively in the same manner as in Example 2. The oxygen content of the products was 5.6% and 8.3% respectively.

EXAMPLE 21

5 g. of polybutadiene (having a molecular weight of 1900 and consisting of 1% of 1,2-bond, 72% of cis-1,4-bond and 27% of trans-1,4-bond, hereinafter referred to as "polymer C"), 1 g. of MAH, 7.5 cc. of benzene, 1 cc. of dimethylacetamide and 50 mg. of azobisisobutyronitrile were reacted at 60° C. for 20 hours in a nitrogen gas atmosphere. In the initial stage of this reaction, precipitation occurred, but in 15 hours the reaction gave a uniform solution. During the reaction no gelation took place. The resultant maleinized product was recovered in the same manner as in Example 2. The result of elementary analysis on the product gave an oxygen content of 4.9%.

COMPARISON EXAMPLE 5

5 g. of polymer C, 1 g. of MAH, 7.5 cc. of benzene and 50 mg. of azobisisobutyronitrile were reacted under the same conditions as in Example 21. In 8 hours gelation took place. The oxygen content of the reaction product was 4.8%.

EXAMPLE 22

5 g. of polymer C, 2 g. of MAH, 10 cc. of tetrahydrofuran, 50 mg. of azobisisobutyronitrile and 0.5 cc. of dimethylformamide were placed in a polymerization tube and reacted at 60° C. for 14.5 hours in a nitrogen gas atmosphere. During the reaction no gelation was observed. The resultant maleinized product was recovered in the same manner as in Example 2. The oxygen content of the product was 5.2%.

EXAMPLE 23

5 g. of polymer C, 1 g. of MAH, 10 cc. of dioxane, 0.3 cc. of dimethylformamide and 0.1 cc. of di-t-butyl peroxide were reacted with stirring at 110° C. for 10 hours. The viscosity of the system increased during the reaction without any gelation. The resultant maleinized product was recovered in the same manner as in Example 2. The oxygen content of the product was 6.7%.

EXAMPLE 24

50 g. of polybutadiene (having a molecular weight of 1960; consisting of 89.9% of 1,2-bond and 10.1% of cis-1,3-bond; carboxyl group-terminated; acid value being 46.0), 500 mg. of benzoyl peroxide, 50 cc. of isobutyl-methylketone, 5 cc. of dimethylformamide and 5 g. of MAH were placed in an autoclave and reacted with stirring at 120 to 130° C. for 2.5 hours. The reaction product was mixed with water and then washed with methanol. The resultant maleinized product was recovered in the same manner at in Example 2. Elementary analysis on the product gave an oxygen content of 6.9%. The product was light brown in color and during the reaction no gelation took place.

EXAMPLE 25

2.5 g. of polymer B, 2.5 g. of monochloromaleic acid anhydride, 27.5 cc. of xylene, 3 cc. of dimethylformamide and 50 mg. of azobisisobutyronitrile were reacted at 60° C. for 20 hours in a nitrogen gas atmosphere, with the result that the viscosity of reaction solution increased, but no gelation took place. The resultant maleinized product was recovered in the same manner as in Example 2 and analyzed by infrared absorption spectrum. Absorption of carbonyl group was observed at 1720/cm.

COMPARISON EXAMPLE 6

2.5 g. of polymer B, 2.5 g. of monochloromaleic acid anhydride, 27.5 cc. of xylene and 50 mg. of azobisisobutyronitrile were reacted for 10 hours under the same conditions as in Example 25. As a result, gelation took place. As the result of analyzing this reaction product by infrared absorption spectrum, carbonyl group was absorbed at 1720/cm.

EXAMPLE 26

20 g. of linseed oil for industrial use, 5.4 g. of MAH and 1 cc. of dimethylformamide were mixed and reacted at 200° C. for 3 hours. The resultant maleinized product was recovered in the same manner as in Example 2. The oxygen content of the reaction product was 17%. No gelation took place during the reaction.

COMPARISON EXAMPLE 7

A mixture comprising 20 g. of linseed oil for industrial use and 5.4 g. of MAH was reacted at 200° C. for 3 hours. The oxygen content of the reaction product was 19% and the viscosity of the reaction solution was about 3 times that of the reaction solution obtained in Example 26.

EXAMPLE 27

10 g. of polymer B, 10 g. of MAH, 20 cc. of xylene, 0.1 cc. of di-t-butyl peroxide and 2 cc. of dimethylformamide were placed in a glass reaction container and reacted with stirring at 143° C. for 10 minutes. During the reaction no gelation took place. The resultant maleinized product was recovered in the same manner as in Example 2. The oxygen content of the gelled reaction product was 12.3%. The reaction product was light brown in color.

COMPARISON EXAMPLE 8

10 g. of polymer B, 10 g. of MAH, 20 cc. of xylene and 0.1 cc. of di-t-butyl peroxide were reacted in the same manner as in Example 27. In 10 minutes, gelation took place. The oxygen content in the reaction product was 8.8%.

What I claim is:

1. In reacting a maleic anhydride compound with at least one unsaturated polymer having ethylenic double bond in the molecule, to produce a maleinized product, the improvement wherein said reaction is carried out in the presence of at least 0.01 weight percent, based on the weight of the maleic anhydride compound used, of at least one of nitrogen-containing compounds selected from the group consisting of (1) ammonia;
(2) ammonium salts of saturated fatty acids having the formula of $$R^1COONH_4$$

wherein $R^1$ is hydrogen or an alkyl having 1 to 18 carbon atoms;

(3) monoamine compounds having the formula of

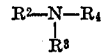

or

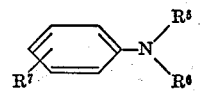

wherein $R^2$, $R^3$ and $R^4$ are hydrogen, allyl, propargyl, an alkyl of 1 to 18 carbon atoms or an alkyl of 1 to 18 carbon atoms containing 1 to 3 substitutes of halogen, hydroxyl, carboxyl and $—OR^8$, $R^8$ being an alkyl of 1 to 3 carbon atoms, provided that the three of $R^2$, $R^3$ and $R^4$ are not hydrogen, $R^5$ and $R^6$ are hydrogen or an alkyl of 1 to 2 carbon atoms and $R^7$ is hydrogen or methyl;

(4) diamine compounds having the formula of

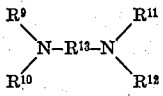

wherein $R^9$, $R^{10}$, $R^{11}$, $R^{12}$ are hydrogen or an alkyl of 1 to 4 carbon atoms and $R^{13}$ is an alkylene of 1 to 6 carbon atoms; and (5) amide compounds having the formula of

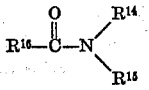

or

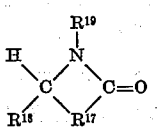

wherein $R^{14}$ and $R^{15}$ are phenyl, cyclohexyl or an alkyl of 1 to 4 carbon atoms, $R^{16}$ is an alkyl of 1 to 17 carbon atoms, an alkenyl of 2 to 3 carbon atoms, phenyl, carboxyphenyl, a carboxy-substituted alkyl of 1 to 3 carbon atoms or an amine-substituted alkyl of 1 to 3 carbon atoms, $R^{17}$ is an alkylene of 2 to 4 carbon atoms, and $R^{18}$ and $R^{19}$ are hydrogen or methyl.

2. The maleinization process according to claim 1, in which said nitrogen-containing compound is ammonia.

3. The maleinization process according to claim 1, in which said nitrogen-containing compound is at least one of ammonium salts of saturated fatty acids having the formula of $$R^1COONH_4$$

wherein $R^1$ is hydrogen or an alkyl having 1 to 18 carbon atoms.

4. The maleinization process according to claim 3 in which said ammonium salt of saturated fatty acid is at least one species selected from the group consisting of ammonium formate, ammonium acetate, ammonium caproate, ammonium caproate, ammonium laurate, ammonium palmitate and ammonium stearate.

5. The maleinization process according to claim 4 in which said ammonium salt of saturated fatty acid is at least one species selected from the group consisting of ammonium acetate and ammonium laurate.

6. The maleinization process according to claim 1, in which said nitrogen-containing compound is at least one of monoamine compounds having the formula of

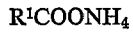

wherein $R^2$, $R^3$ and $R^4$ are hydrogen, allyl, propargyl, an alkyl of 1 to 18 carbon atoms or an alkyl of 1 to 18 carbon atoms containing 1 to 3 substitutes of halogen, hydroxyl, carboxyl and $-OR^8$, $R^8$ being an alkyl of 1 to 3 carbon atoms, provided that the three of $R^2$, $R^3$ and $R^4$ are not hydrogen.

7. The maleinization process according to claim 6, in which said monoamine compound is at least one species selected from the group consisting of methyl amine, ethyl, amine, propyl amine, isopropyl amine, butyl amine, pentyl amine, hexyl amine, octyl amine, octadecyl amine, ethanol amine, 2-aminopropane1-ol, 2-chloroethyl amine, 2-aminoethyl ether, 3-methoxypropyl amine, 3-ethoxypropyl amine, α-aminovaleric acid, α-aminopropionic acid, dimethyl amine, diethyl amine, dipropyl amine, didodecyl amine, ethylpropyl amine, ethylhexadecyl amine, propylbutyl amine, butylhexadecyl amine, diethanol, amine, trimethyl amine, triethyl amine, triundecyl amine, dimethylethyl amine, methylethylpropyl amine, diethylhexadecyl amine, triethanol amine, allyl amine, diallyl amine, allyl-

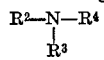

methyl amine, N,N-dimethylpropargyl amine and piperidine.

8. The maleinization process according to claim 7, in which said monoamine compound is at least one species selected from the group consisting of methyl amine, ethyl amine, propyl amine, butyl amine, dimethyl amine, triethyl amine, diethyl amine, dipropyl amine, ethanol amine, di(2-ethyl hexyl) amine, diethanol amine, and piperidine.

9. The maleinization process according to claim 1, in which said nitrogen-containing compound is at least one of monoamine compounds having the formula of

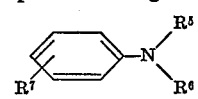

wherein $R^5$ and $R^6$ are hydrogen or an alkyl of 1 to 2 carbon atoms and $R^7$ is hydrogen or methyl.

10. The maleinization process according to claim 9, in which said monoamine compound is at least one species selected from the group consisting of aniline, aminotoluene, N-ethylaniline, N-methylaniline and N,N-dimethyl aniline.

11. The maleinization process according to claim 10, in which said monoamine compound is at least one species selected from the group consisting of aniline, N-ethylaniline and N-methylaniline.

12. The maleinization process according to claim 1, in which said nitrogen-containing compound is at least one of diamine compounds having the formula of

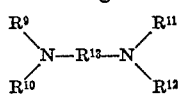

wherein $R^9$, $R^{10}$, $R^{11}$ and $R^{12}$ are hydrogen or an alkyl of 1 to 4 carbon atoms and $R^{13}$ is an alkylene of 1 to 6 carbon atoms.

13. The maleinization process according to claim 12, in which said nitrogen-containing compound is at least one species selected from the group consisting of methylene diamine, ethylene diamine, tetramethyl diamino methane, N,N'-dimethylmethylene dimaine, N-methylethylene diamine, N,N'-dimethylethylene diamine, N-ethylethylene diamine, N,N'-dibutylethylene diamine, tetramethylene diamine, pentamethylene diamine, hexamethylene diamine and dimethylene diamine.

14. The maleinization process according to claim 13, in which said diamine compound is at least one species selected from the group consisting of methylene diamine, ethylene diamine, N-methylene diamine and N,N-dibutylethylene diamine.

15. The maleinization process according to claim 1, in which said nitrogen-containing compound is at least one of amide compounds having the formula of

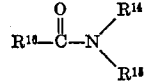

wherein $R^{14}$ and $R^{15}$ are phenyl, cyclohexyl or an alkyl of 1 to 4 carbon atoms and $R^{16}$ is an alkyl of 1 to 17 carbon atoms, an alkenyl of 2 to 3 carbon atoms, phenyl, carboxyphenyl, a carboxy-substituted alkyl of 1 to 3 carbon atoms or an amide-substituted alkyl of 1 to 3 carbon atoms.

16. The maleinization process according to claim 15, in which said amide compound is at least one species selected from the group consisting of formamide, N-methylformamide, N,N-dimethyl formamide, N,N-diethyl foramide, acetamide, N-methyl acetamide, N,N-dimethyl acetamide, N,N-diethylacetamide, oxalic acid amide, N-phenyl acetamide, acetamide benzoic acid, propyonic acid amide, N-ethyl propyonic acid amide, butylamide, 4-methyl-2-pentene amide, pentadecane amide, octadecane amide, acryl amide, N - methylacrylamide, N,N - dimethylacryl amide, N - butylacryl amide, N,N - dibutylacryl amide, methacryl amide, N-methylmethacryl amide, N,N-dimethylmethacryl amide, N,N-dimethyl succinic acid amide, succinic acid amide, maleic acid amide, N,N-dimethyl maleic acid amide, N,N-diethyl maleic acid amide, cyclohexyl amide, pyrrolidone, benzamide, N-ethyl benzamide, N-cyclohexyl benzamide, malonamide and adipoamide.

17. The maleinization process according to claim 16, in which said amide compound is at least one species selected from group consisting of N-methyl formamide, N,N-dimethyl formamide, N,N-diethylformamide N,N-dimethylacetamide, N,N - diethyl acetamide, maleic acid amide and acryl amide.

18. The maleinization process according to claim 1, in which said nitrogen-containing compound is at least one of amide compounds having the formula of

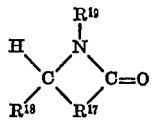

wherein $R^{17}$ is an alkylene of 2 to 4 carbon atoms and $R^{18}$ and $R^{19}$ are hydrogen or methyl.

19. The maleinization process according to claim 18, in which said amide compound is at least one species selected from the group consisting of caprolactam, γ-valerolactam, N-methyl-δ-valerolactam and pyrrolidone.

20. The process of claim 1 wherein the unsaturated polymer is synthetic unsaturated polymer.

References Cited
UNITED STATES PATENTS

| | | | |
|---|---|---|---|
| 3,567,691 | 3/1971 | Van Breen | 260—78.4 |
| 3,518,213 | 6/1970 | Miyoshi et al. | 260—22 |
| 3,511,816 | 5/1970 | Dickakian | 260—78.4 |
| 3,663,523 | 5/1972 | Parkin et al. | 260—101 |
| 3,390,046 | 6/1968 | McDavid | 162—180 |

JOSEPH L. SCHOFER, Primary Examiner

J. KIGHT, Assistant Examiner

U.S. Cl. X.R.

260—18 R, 22 CAT, CQ, 78.5 R, 101, 709, 768, 404.8